J. A. HARD.
Studs for Fastening Neck-Ties.
No. 135,803.                   Patented Feb. 11, 1873.
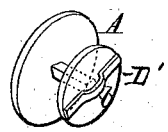
Fig. 1.
Fig. 2.
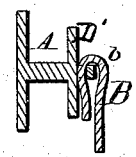
Fig. 3.
Fig. 4.
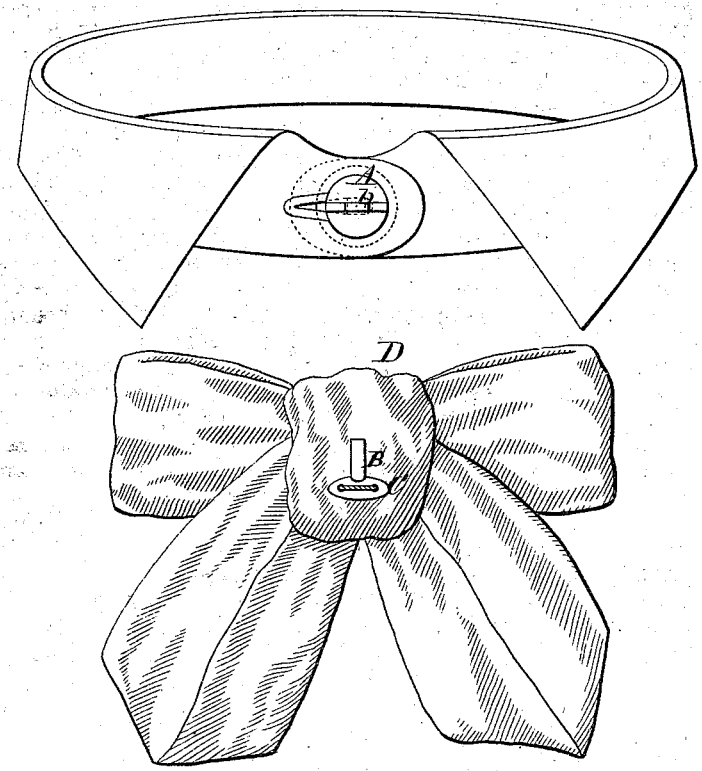
Fig. 5.
WITNESSES.
Villette Anderson
Phil C Masi
INVENTOR.
Josiah A. Hard
Chipman Hosmer & Co
Attorneys

UNITED STATES PATENT OFFICE.

JOSIAH A. HARD, OF LAWRENCE, KANSAS.

IMPROVEMENT IN STUDS FOR FASTENING NECK-TIES.

Specification forming part of Letters Patent No. 135,803, dated February 11, 1873.

*To all whom it may concern:*

Be it known that I, JOSIAH A. HARD, of Lawrence, in the county of Douglas and State of Kansas, have invented a new and valuable Improvement in Stud and Tie-Fasteners; and I do hereby declare that the following is a full, clear, and exact description of the construction and operation of the same, reference being had to the annexed drawing making a part of this specification, and to the letters and figures of reference marked thereon.

Figure 1 of the drawing is a representation of my stud and tie-fastener in perspective. Fig. 2 is a perspective view of the hook. Fig. 3 is a section of stud and hook connected. Fig. 4 is a front view of my tie-fastener attached to the collar. Fig. 5 is a view of the hook attached to neck-tie.

This invention has relation to neck-tie fasteners; and it consists in constructing the collar-button with a loop, and providing the neck-tie or bow with a hook to be attached to said loop, substantially as hereinafter more fully specified.

Referring to the drawing, A designates the collar-button, having a small disk, D', attached to the lower end of its shank; and $b$ represents a loop attached to the bottom of the disk D', as shown. B designates a metallic hook, having at the end of its shank a perforated plate, C, which is sewed to the back part of the "butterfly" bow D. The latter is attached to the collar by catching the hook upon the loop $b$, as shown in Fig. 3. The disk D' serves to keep the hook in place, and secure it in a vertical position when connected with the loop $b$.

What I claim as my invention, and desire to secure by Letters Patent, is—

The button A having disk D', provided with the loop $b$ adapted for connection with the hook B, substantially as and for the purpose specified.

In testimony that I claim the above I have hereunto subscribed my name in the presence of two witnesses.

JOSIAH A. HARD.

Witnesses:
N. W. TAYLOR,
J. L. BRIGGS.